(12) United States Patent
Meggiolan

(10) Patent No.: US 10,378,605 B2
(45) Date of Patent: Aug. 13, 2019

(54) PAD FOR A BICYCLE DISC BRAKE AND DISC BRAKE COMPRISING SUCH A PAD

(71) Applicant: Campagnolo S.r.l., Vicenza (IT)

(72) Inventor: Mario Meggiolan, Creazzo (VI) Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/366,708

(22) Filed: Dec. 1, 2016

(65) Prior Publication Data

US 2017/0159736 A1 Jun. 8, 2017

(30) Foreign Application Priority Data

Dec. 2, 2015 (IT) .............................. UB15A006084

(51) Int. Cl.
*F16D 66/02* (2006.01)
*B62L 1/00* (2006.01)
*F16D 65/092* (2006.01)

(52) U.S. Cl.
CPC ................ *F16D 66/02* (2013.01); *B62L 1/00* (2013.01); *B62L 1/005* (2013.01); *F16D 65/092* (2013.01); *F16D 66/028* (2013.01)

(58) Field of Classification Search
CPC . B62L 1/005; B62L 1/00; F16D 66/02; F16D 65/092; F16D 65/04; F16D 66/021; F16D 66/022; F16D 66/026
USPC ................................ 188/1.11 W, 1.11 R, 72.3
See application file for complete search history.

(56) References Cited

U.S. PATENT DOCUMENTS

| | | | | | |
|---|---|---|---|---|---|
| 3,190,397 | A | * | 6/1965 | Sudres ................ | B29C 33/0044 188/1.11 R |
| 3,662,863 | A | * | 5/1972 | Dombeck ............... | F16D 66/02 116/208 |
| D277,093 | S | * | 1/1985 | Caplygin ...................... | D12/180 |
| 5,145,037 | A | * | 9/1992 | Kobayashi ............ | F16D 55/227 188/250 B |
| 5,261,508 | A | * | 11/1993 | Kikuchi .................. | F16D 66/02 116/208 |
| 5,743,361 | A | * | 4/1998 | Winter .................. | F16D 65/092 188/244 |
| 5,791,443 | A | * | 8/1998 | Manz ...................... | F16D 65/08 188/250 B |

(Continued)

FOREIGN PATENT DOCUMENTS

| | | |
|---|---|---|
| CN | 201434031 Y * | 3/2010 |
| CN | 204253681 U | 4/2015 |
| DE | 20305422 U1 | 11/2003 |

OTHER PUBLICATIONS

Italian Search Report and Written Opinion in Italian Application No. UB2015A006084, dated Aug. 23, 2016, with English translation.

*Primary Examiner* — Thomas W Irvin
(74) *Attorney, Agent, or Firm* — Volpe and Koenig, P.C.

(57) ABSTRACT

The invention relates to a pad for a bicycle disc brake, comprising a support frame and an element made of friction-wearing material associated with said support frame. The element made of friction-wearing material comprises a visual wearing indicator, which preferably is defined on an upper portion of the element made of friction-wearing material, more preferably at a side end area of said upper portion.
The invention also relates to a bicycle disc brake comprising a pair of pads of the type described above.

14 Claims, 10 Drawing Sheets

(56) References Cited

U.S. PATENT DOCUMENTS

| | | | | |
|---|---|---|---|---|
| 6,105,735 | A * | 8/2000 | Lin | B62L 1/10 |
| | | | | 188/24.12 |
| 7,275,625 | B2 * | 10/2007 | Oi | F16D 69/04 |
| | | | | 188/250 B |
| 7,424,936 | B2 * | 9/2008 | McClellan | F16D 66/028 |
| | | | | 188/1.11 R |
| D602,824 | S * | 10/2009 | Liu | D12/180 |
| D603,771 | S * | 11/2009 | Liu | D12/180 |
| D604,214 | S * | 11/2009 | Liu | D12/180 |
| D608,704 | S * | 1/2010 | Liu | D12/180 |
| D615,010 | S * | 5/2010 | Liu | D12/180 |
| 8,505,698 | B2 * | 8/2013 | Liu | F16D 65/0006 |
| | | | | 188/250 B |
| 9,206,866 | B2 * | 12/2015 | Giese | F16D 65/092 |
| 9,458,904 | B2 * | 10/2016 | Kapanowski | F16D 69/00 |
| 9,657,797 | B2 * | 5/2017 | Buxton | F16D 69/00 |
| 2005/0269175 | A1 * | 12/2005 | Iwai | B62L 1/005 |
| | | | | 188/251 A |
| 2006/0096814 | A1 * | 5/2006 | Hoffrichter | F16D 65/0006 |
| | | | | 188/73.37 |
| 2007/0107994 | A1 | 5/2007 | McClellan | |
| 2007/0137950 | A1 * | 6/2007 | Jen | F16D 55/228 |
| | | | | 188/72.3 |
| 2009/0071766 | A1 * | 3/2009 | Gaulrapp | F16D 65/0006 |
| | | | | 188/72.1 |
| 2009/0084638 | A1 * | 4/2009 | Masterson | F16D 65/092 |
| | | | | 188/1.11 W |
| 2011/0162919 | A1 * | 7/2011 | Kapanowski | F16D 69/00 |
| | | | | 188/73.1 |
| 2013/0174656 | A1 | 7/2013 | MacKelvie | |
| 2018/0223927 | A1 * | 8/2018 | Meggiolan | B32B 15/14 |

* cited by examiner

PAD FOR A BICYCLE DISC BRAKE AND DISC BRAKE COMPRISING SUCH A PAD

CROSS REFERENCE TO RELATED APPLICATION(S)

This application claims the benefit of Italian Application No. UB2015A006084, filed on Dec. 2, 2015 and incorporated herein by reference as if fully set forth.

FIELD OF INVENTION

The present invention relates to a pad for a bicycle disc brake.

The invention also relates to a bicycle disc brake comprising such a pad.

BACKGROUND

As known, disc brakes are now commonly used in bicycles. Such disc brakes, indeed, are often preferred to other kinds of conventional brakes since they ensure a high braking force and are less subject to problems caused by mud or water.

Typically, a disc brake comprises a caliper mounted on the frame of the bicycle and a brake disc mounted on the hub of the wheel. Inside the caliper there are two or four opposite pads. The brake disc rotates inside the space defined between the opposite pads. By actuating the brake lever, the pads are brought towards the brake disc, generating friction on the brake disc and, consequently, braking the wheel.

Mechanically-controlled disc brakes and hydraulically-controlled disc brakes are known. In the former, the movement of the pads following the actuation of the brake lever takes place through the effect of a pulling action exerted by a metallic cable associated with the brake lever and with the caliper that supports the pads. In the latter, the movement of the pads takes place through the effect of the thrusting action exerted by a hydraulic piston on each pad.

Each pad typically comprises a support frame configured to be coupled with the caliper and an element made of friction-wearing material (hereinafter also indicated as "brake lining") associated with the support frame and intended to slide on the brake disc during braking.

The pads must be replaced when the brake linings reach a certain degree of wear. In order to know if and when it is necessary or advisable to replace the pads it is known to periodically measure the thickness of the brake lining. Such measurement requires a periodical manual intervention by the cyclist.

The Applicant addresses the problem with a system that makes it possible to indicate to the cyclist the moment when it is necessary to replace the pads without it being required to carry out manual measurements.

SUMMARY

The present invention therefore relates, in a first aspect thereof, to a pad for a bicycle disc brake, comprising a support frame and an element made of friction-wearing material associated with said support frame, characterized in that the element made of friction-wearing material comprises a visual wearing indicator.

Advantageously, the aforementioned visual wearing indicator provides the cyclist with an indication of the degree of wearing of the pad at a simple glance by the cyclist.

Therefore, it is an effective system that does not require any manual intervention by the cyclist.

Preferably, the visual wearing indicator is defined on an upper portion of the element made of friction-wearing material. This is so as to be more visible to the cyclist when the wheel is mounted on the bicycle.

Preferably, the visual wearing indicator is defined at at least one side end area of said upper portion. The visual wearing indicator element is thus provided on a limited and marginal portion of the element made of friction-wearing material, namely at an area of the element made of friction-wearing material that provides a modest or zero contribution during braking. In this way, the provision of the visual wearing indicator on the element made of friction-wearing material does not influence the behavior of the pad during braking. Moreover, the provision of the visual wearing indicator on the side end area of the upper portion of the element made of friction-wearing material allows an easy viewing thereof both in the case in which the pad is used in the disc brake of the front wheel of the bicycle and in the case in which the pad is used in the disc brake of the rear wheel of the bicycle.

Preferably, the element made of friction-wearing material comprises an upper surface, a lower surface and two opposite side surfaces, wherein the visual wearing indicator is defined at a corner in which said upper surface joins with one of said side surfaces.

Preferably, the element made of friction-wearing material has a predetermined thickness and the visual wearing indicator is defined by a step having a height lower than said predetermined thickness. In this way, the degree of wearing of the pad is visibly detectable by observing the reduction in height of such a step, such a reduction in height being a direct consequence of the reduction in thickness of the element made of friction-wearing material due to the sliding on the brake disc.

More preferably, said step comprises two substantially perpendicular surfaces, a first surface of said two surfaces defining, in said element made of friction-wearing material, an area of reduced thickness with respect to said predetermined thickness and a second surface of said two surfaces having a height equal to the difference between said predetermined thickness and said reduced thickness, wherein the visual wearing indicator is defined by said second surface. The degree of wearing of the pad is therefore visibly detectable by observing the decrease in height of the aforementioned second surface, such a reduction in height being a direct consequence of the reduction in thickness of the element made of friction-wearing material due to the sliding on the brake disc.

Preferably, said second surface is an inclined surface that connects said upper surface and one of said side surfaces. Such an inclination allows a better visibility of the visual wearing indicator to the cyclist.

Preferably, said step is obtained by partial removal of material, for example through milling. The visual wearing indicator is therefore technically simple and quick to be made.

Preferably, the element made of friction-wearing material comprises a beveled lower portion. The latter facilitates the introduction of the brake disc between the pads during the mounting of the wheel on the bicycle.

Preferably, said beveled lower portion extends along the entire lower surface of the element made of friction-wearing material.

Preferably, said beveled lower portion comprises a central area having a first tapering and opposite side end areas each having a second tapering, wherein said second tapering extends towards said upper surface more than said first tapering. Advantageously, the provision of the second tapering on both the side end areas of the lower portion of the element made of friction-wearing material allows an easy introduction of the brake disc between the pads in the mounting on the bicycle both of a front wheel and of a rear wheel. Moreover, the provision on the side end areas of the element made of friction-wearing material of a tapering having a greater width than that on the central area of the aforementioned element made of friction-wearing material allows the stresses on the aforementioned side end areas, which are weaker than the central area, to be reduced.

Preferably, said second tapering is defined at a corner in which said lower surface joins with at least one of said side surfaces.

Preferably, the support frame comprises a fastening portion provided with a hole for the attachment of the pad to a caliper of the disc brake and a support portion for supporting the element made of friction-wearing material, wherein said fastening portion comprises a pair of arms that extend from said hole towards opposite side ends of the element made of friction-wearing material. The Applicant considers that the particular orientation of the aforementioned arms allows a more effective evacuation of the heat which the pad is subjected to during braking.

In a second aspect thereof, the invention relates to a bicycle disc brake comprising a pair of pads in accordance with the first aspect of the present invention.

Preferably, the support frame is made of metallic material and the disc brake comprises a pneumatic piston coupled with the support frame through at least one magnetic element fixedly associated with the pneumatic piston and arranged between the pneumatic piston and the support frame.

In the preferred embodiment of the present invention the disc brake is therefore a hydraulically-controlled brake and the return of the pads into the rest position when the brake is deactivated takes place due to the magnetic attraction exerted by the magnet on the support frame.

Alternatively, the return action of the pads at rest can be exerted by a spring associated with the support frames of the pads.

BRIEF DESCRIPTION OF THE DRAWING(S)

Further characteristics and advantages of the invention will become clearer from the description of preferred embodiments thereof, made with reference to the attached drawings, wherein.

DETAILED DESCRIPTION OF THE PREFERRED EMBODIMENT(S)

Figure 1:
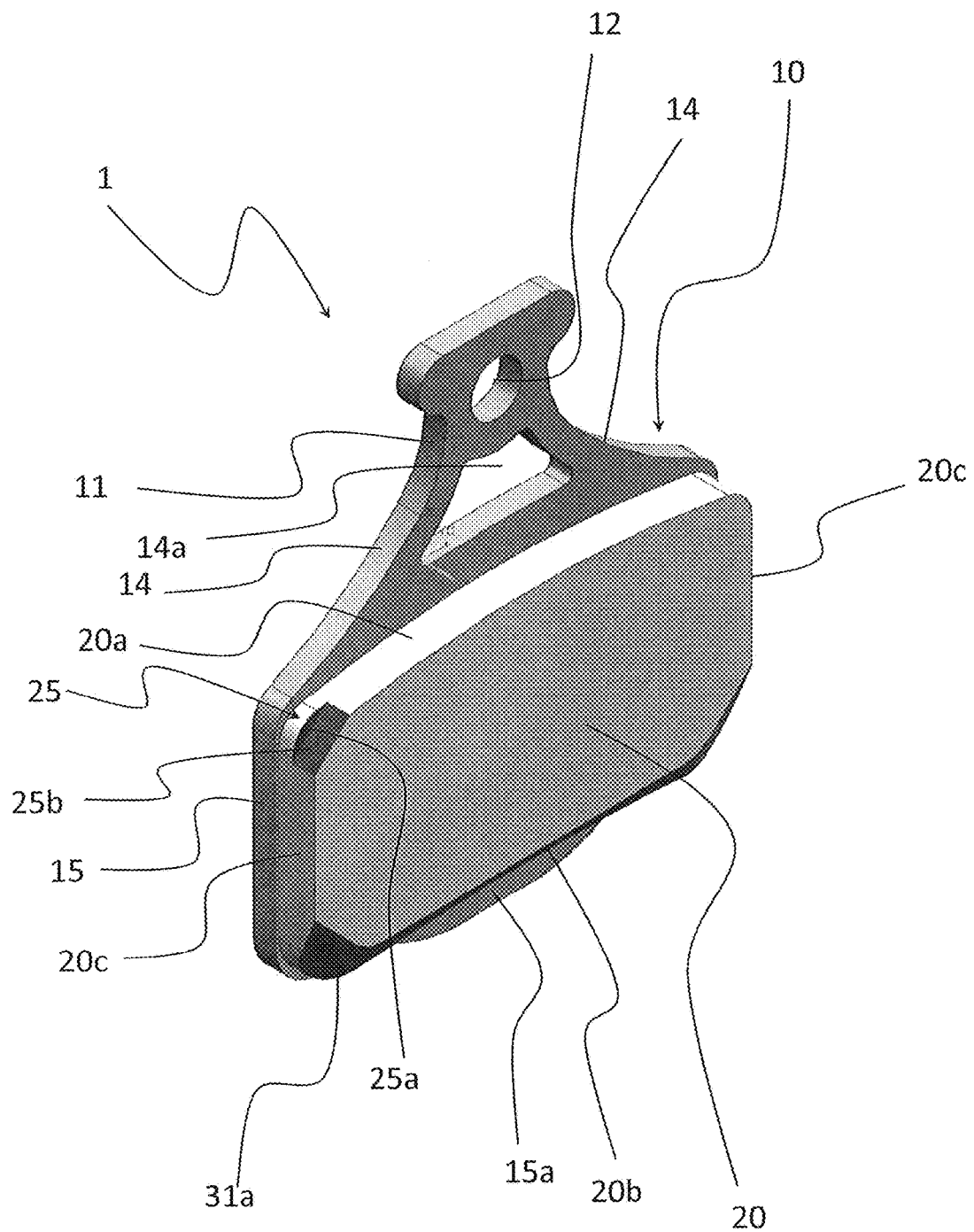
FIG. 1 is a schematic perspective view of a preferred embodiment of a pad for a bicycle disc brake in accordance with the present invention.
Figure 2:
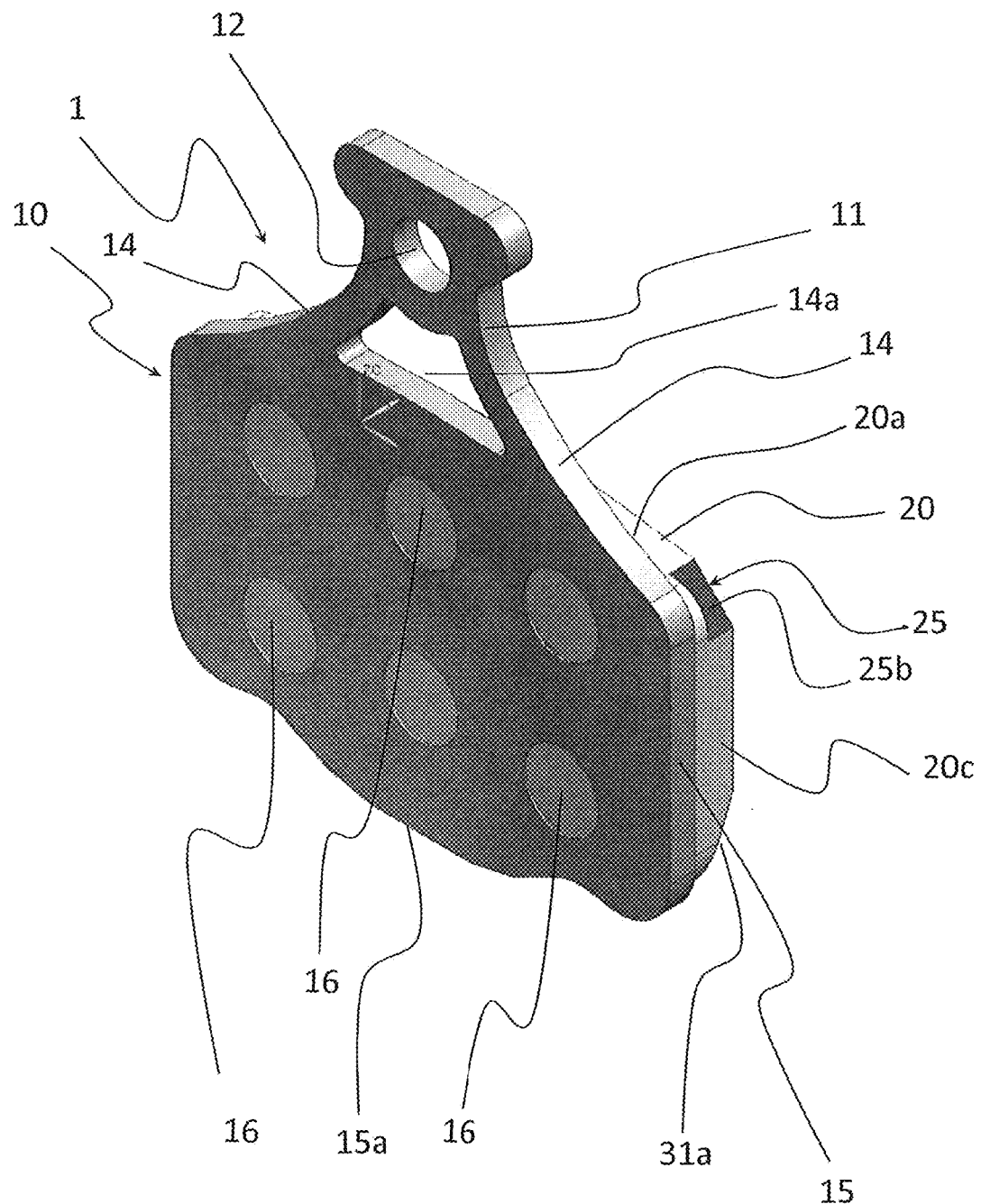
FIG. 2 is a schematic perspective view of the pad of FIG. 1 from a different point of observation.

Throughout the present description and in the subsequent claims the expressions "upper", "lower" and "side" are used with reference to a view of the pad oriented like in the attached FIG. 2. Such an orientation is practically the same as that taken up by the pad when it is mounted on the caliper of the disc brake and such a caliper is mounted on the bicycle.

In the attached figures, reference numeral 1 indicates a pad for a bicycle disc brake in accordance with the present invention.

Figure 6:
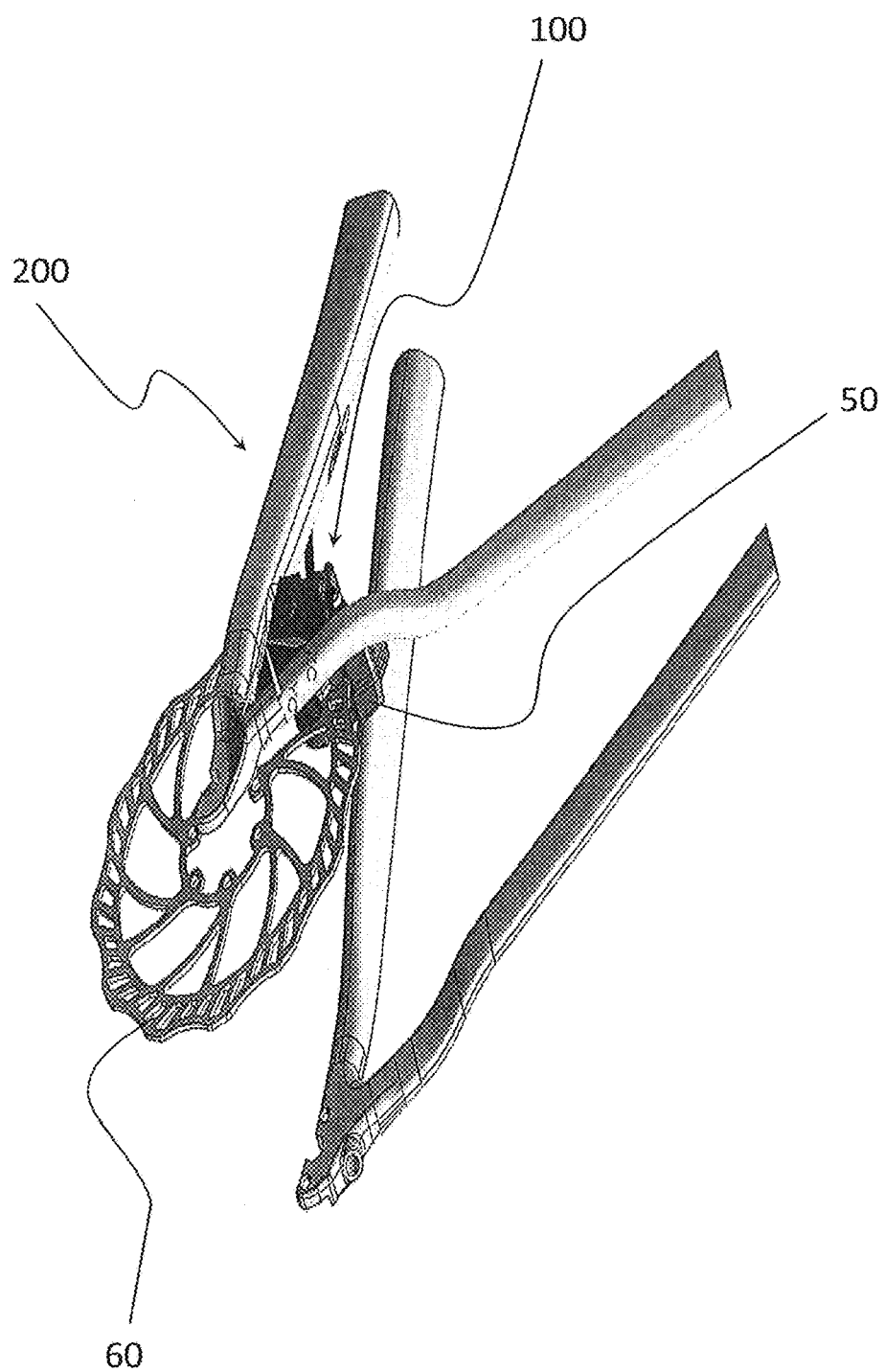
FIG. 6 is a schematic perspective view of a preferred embodiment of a disc brake in accordance with the present invention, associated with a bicycle frame.
Figure 7:
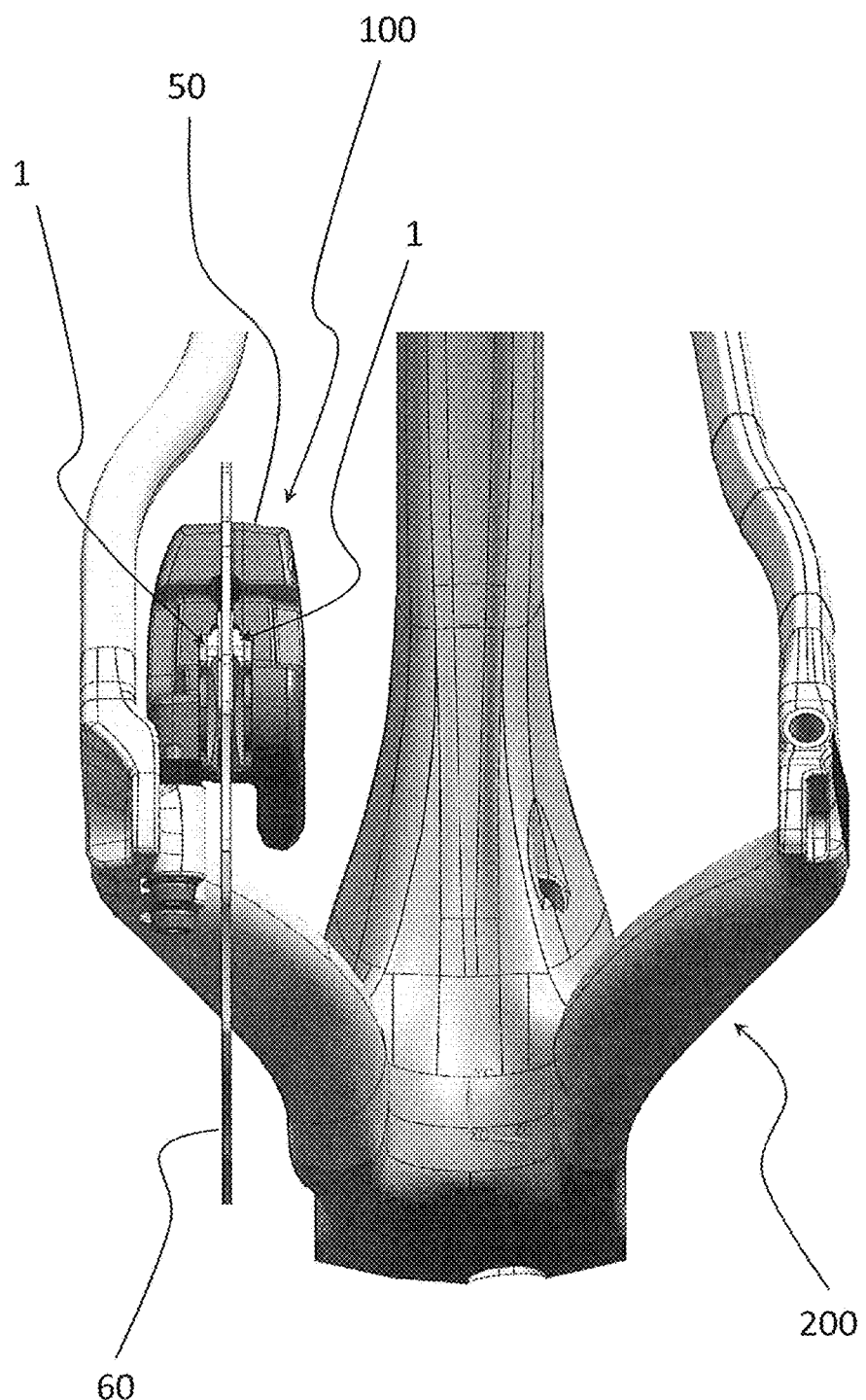
FIG. 7 is a schematic view from below of what is illustrated in FIG. 6.

As shown in FIGS. 6 and 7, the disc brake, indicated with 100, comprises a caliper 50 configured to be associated with the frame 200 of a bicycle and a brake disc 60 configured to be associated with a hub (not shown) of a front or rear wheel of the bicycle.

FIGS. 6 and 7 show the caliper 50 associated with the portion of frame of the bicycle at which the rear wheel of the bicycle is mounted.

What is described hereinafter with reference to the pad and to the disc brake of the present invention is valid in an identical manner in the case of a disc brake for a front wheel of the bicycle.

Inside the caliper 50 there are at least two opposite pads 1 in accordance with the present invention.

As shown in FIGS. 6-10, the brake disc 60 comprises a radially outer annular portion that is arranged inside the space defined between the pads 1. By actuating the brake lever (not shown), the pads 1 are brought closer to the brake disc 60 (which rotates integrally with the wheel of the bicycle), generating a friction on the brake disc 60 and, consequently, braking the wheel.

With reference to FIGS. 1-5, the pad 1 comprises a frame 10 intended to be associated with the caliper 50 and an element 20 made of friction-wearing material associated with the frame 10.

The frame 10 is made of a metallic material.

The frame 10 comprises a fastening portion 11 for fastening the frame 10 to the caliper 50 and a support portion 15 for supporting the element 20 made of friction-wearing material.

Figure 8:
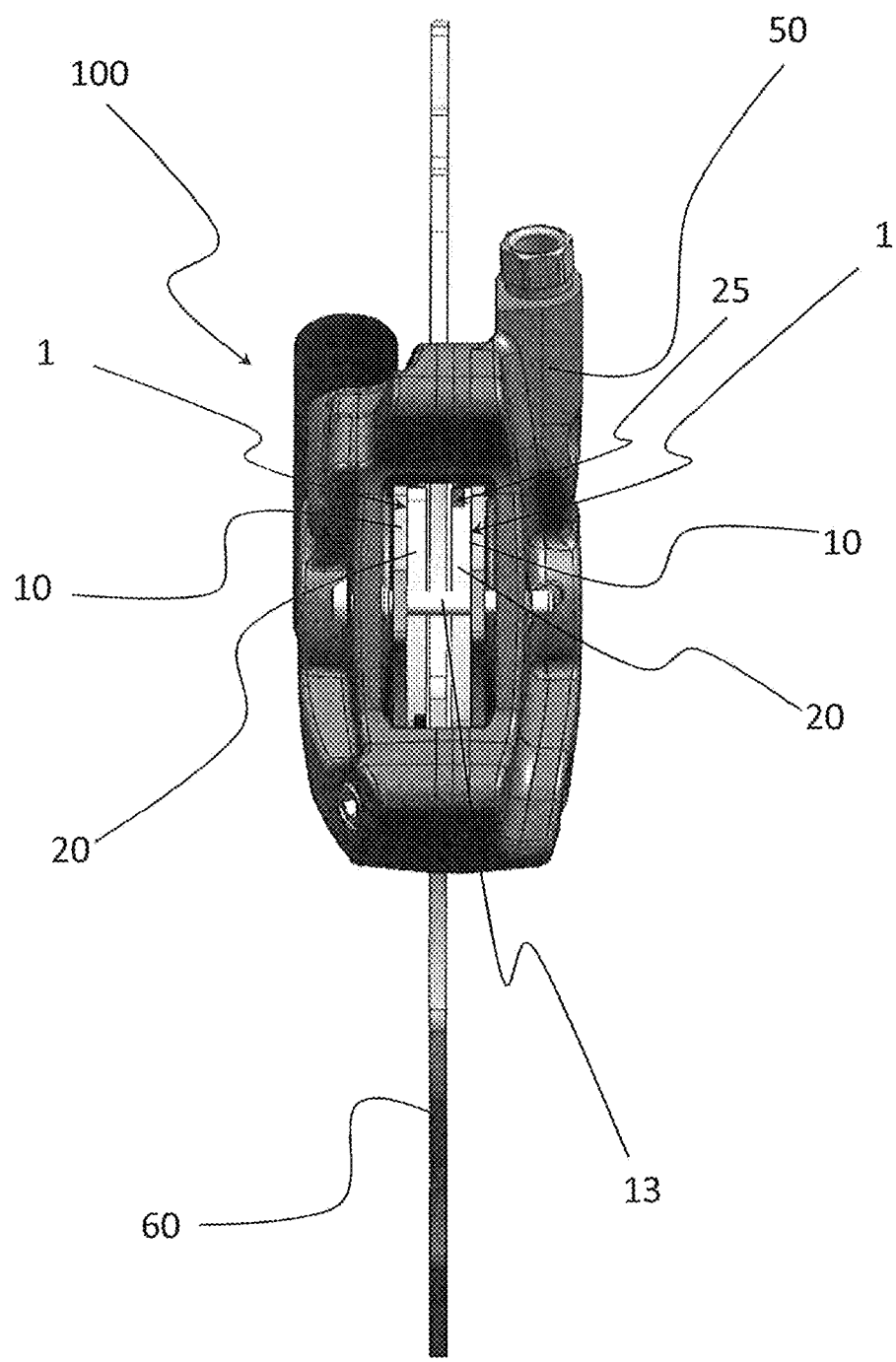
FIG. 8 is a schematic view from below of the disc brake of FIG. 6.
Figure 9:
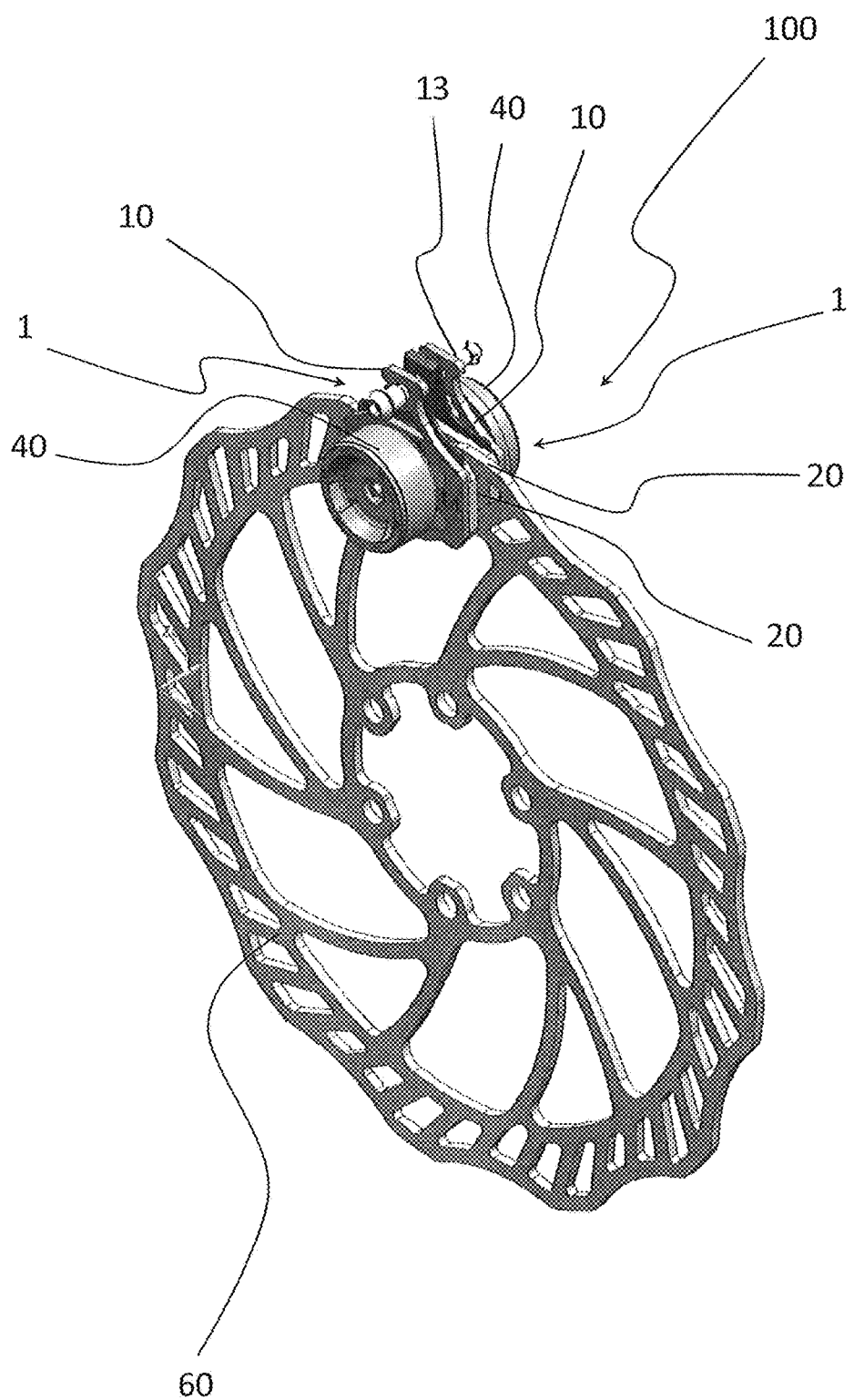
FIG. 9 is a schematic perspective view of a portion of a first embodiment of a disc brake in accordance with the present invention.
Figure 10:
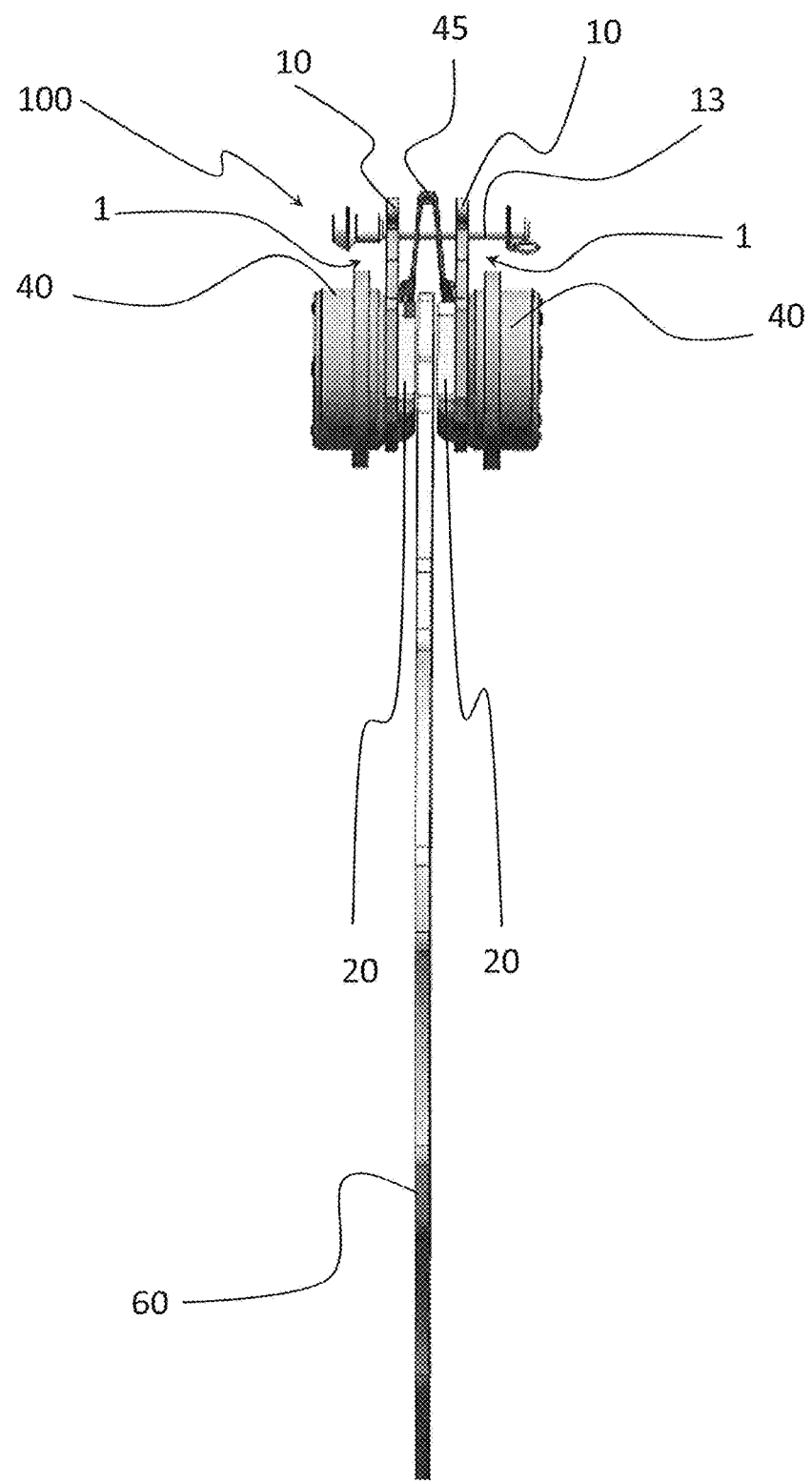
FIG. 10 is a schematic front view of a portion of an alternative embodiment of the disc brake of the present invention.

The fastening portion 11 comprises a hole 12 for housing a pin 13 intended to connect the frame 10 to the caliper 50. Such a pin 13 is shown in FIGS. 8-10.

Figure 3:
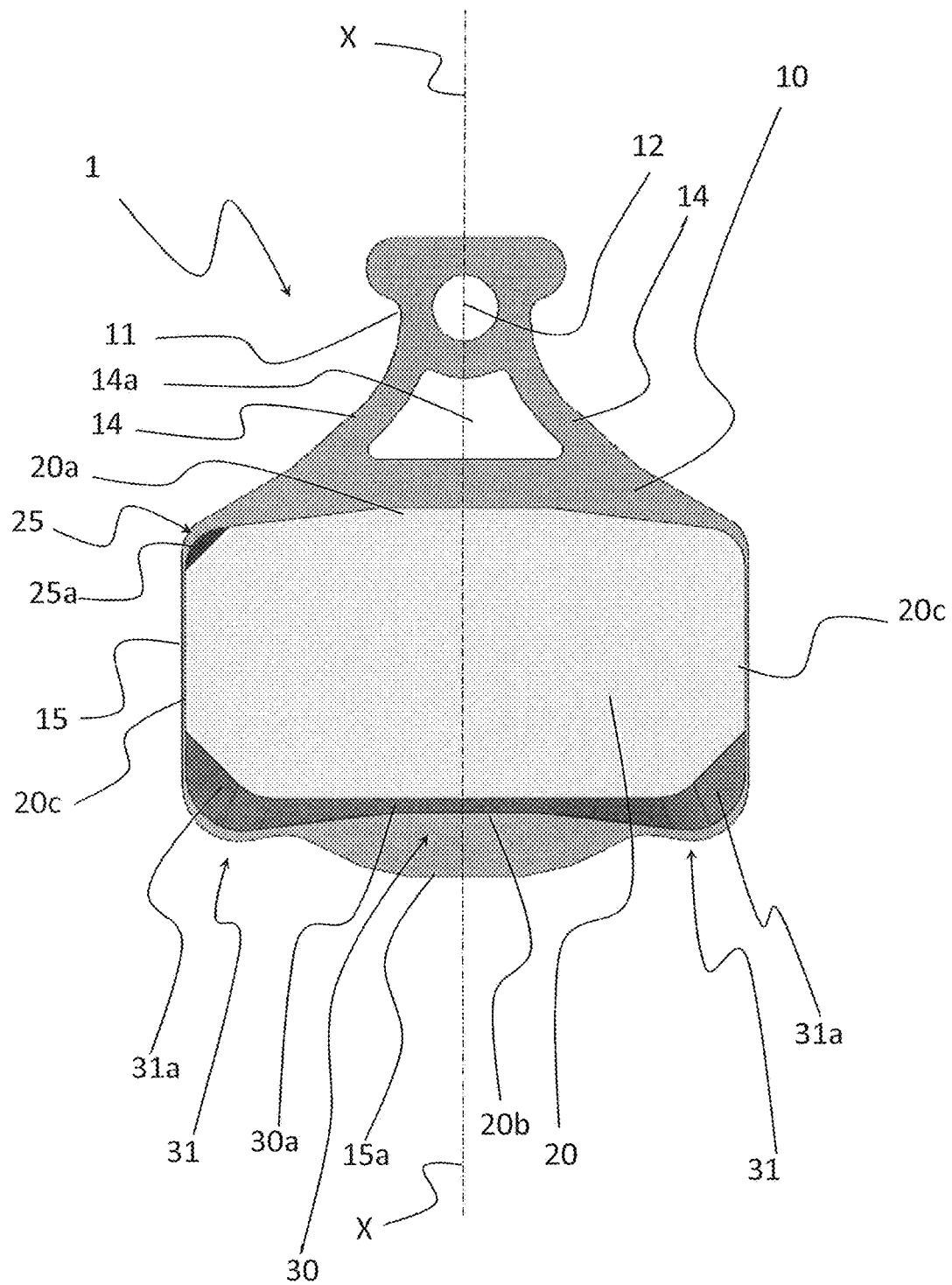
FIG. 3 is a schematic front view of the pad of FIG. 1.
Figure 4:
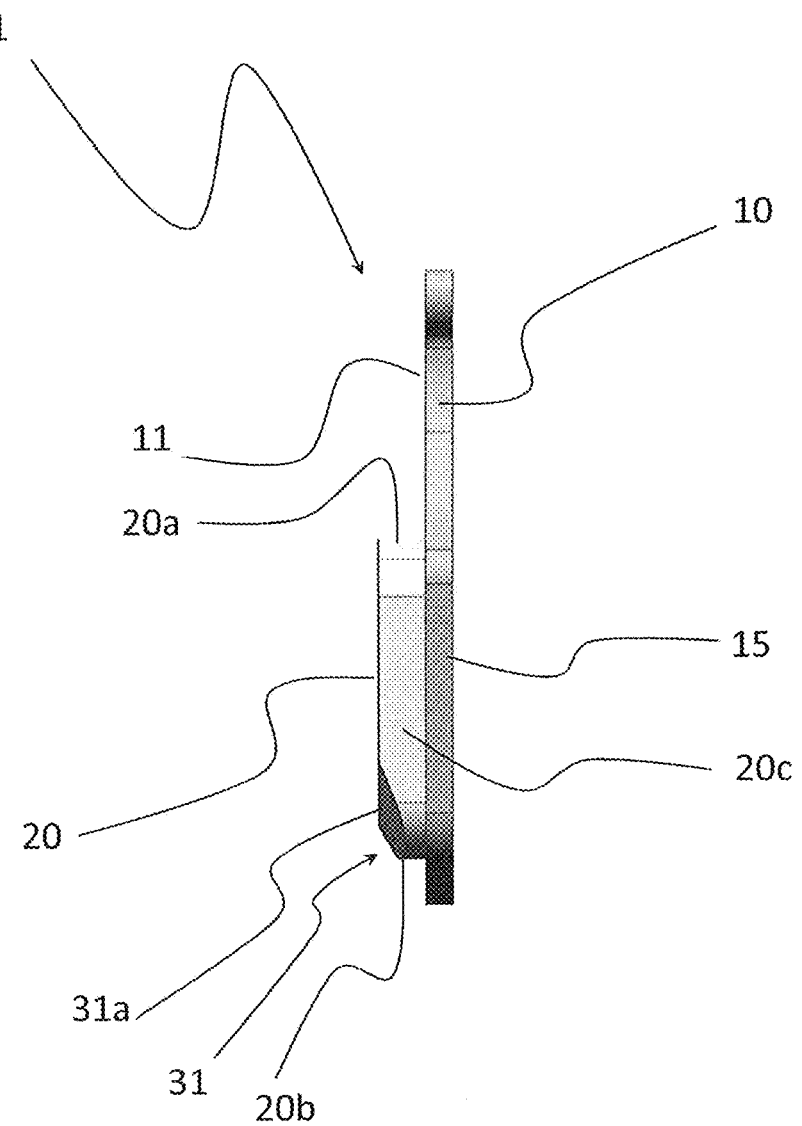
FIG. 4 is a schematic side view of the pad of FIG. 1.

As shown in FIG. 3, the frame 10 has a symmetrical shape with respect to a transverse middle plane X-X that passes through the center of the hole 12.

The fastening portion 11 further comprises a pair of arms 14 that extend from the area of the frame 10 wherein the hole 12 is formed to the side end areas of the upper part of the support portion 15 of the element 20 made of friction-wearing material, and therefore up to close to the opposite side ends thereof.

A lightening opening 14a is formed between the arms 14.

As shown in FIG. 2, the support portion 15 for supporting the element 20 made of friction-wearing material comprises a plurality of holes 16 (six in the specific example shown herein) that house by interference corresponding portions of the element 20 made of friction-wearing material. The latter is therefore coupled with the frame 10 by interference in the holes 16 and, preferably, by gluing on a face of the lower portion 15 of the frame 10. In FIG. 2, reference numeral 16 is associated with only some of the aforementioned holes.

The support portion 15 of the element 20 made of friction-wearing material has a substantially rectangular shape, with a lower part 15a that has a central area that projects downwards.

The element 20 made of friction-wearing material is made of organic materials, like for example glass fibers or copper fibers with resins, or of metallic materials, like for example sintered metallic powders.

The element 20 made of friction-wearing material has a substantially rectangular shape. It comprises an upper surface 20a, a lower surface 20b substantially parallel to the upper surface 20a, and a pair of opposite side surfaces 20c substantially perpendicular to the upper and lower surfaces 20a, 20b.

The upper and lower surfaces 20a, 20b are slightly concave.

The element 20 made of friction-wearing material has a predetermined thickness and comprises, in a side end area of the upper portion thereof, a visual wearing indicator 25. In particular, the visual wearing indicator 25 is defined at a corner in which the upper surface 20a joins with one of the side surfaces 20c of the element 20 made of friction-wearing material.

Alternative embodiments to the one shown in the attached drawings are foreseen wherein the visual wearing indicator is provided on both the side end areas of the upper portion of the element 20 made of friction-wearing material.

The visual wearing indicator 25 is obtained by partial removal of material, for example through milling. It defines in the element 20 made of friction-wearing material a step having a height lower than the thickness of the element 20 made of friction-wearing material. Such a step comprises a base surface 25a, which defines in the element 20 made of friction-wearing material an area of reduced thickness, and a surface 25b substantially perpendicular to the base surface 25a and having a height equal to the difference between said predetermined thickness and said reduced thickness. The surface 25b is inclined with respect to the upper and side surfaces 20a, 20c and connects the upper surface 20a and a side surface 20c.

The visual wearing indicator 25 is defined by the surface 25b. As the thickness of the element 20 made of friction-wearing material progressively reduces due to the friction with the brake disc 60, the height of the surface 25b reduces, providing the cyclist with a visual indication of the degree of wearing of the element 20 made of friction-wearing material.

FIG. 8 shows how the visual wearing indicator 25 is visible to the cyclist when the pad 1 is mounted in the caliper 50.

The element 20 made of friction-wearing material comprises a beveled lower portion.

Such a beveled lower portion extends continuously along the entire lower surface 20b of the element 20 made of friction-wearing material and comprises a central area 30 having a first tapering 30a and opposite side end areas 31 each having a second tapering 31a.

Alternative embodiments of the pad 1 of the present invention are foreseen wherein the tapering 31a is defined only at one of the opposite side end areas 31.

The tapering 31a is defined at the opposite corners in which the lower surface 20b joins with the side surfaces 20c of the element 20 made of friction-wearing material and extends from the lower surface 20b towards the upper surface 20a of the element 20 made of friction-wearing material more than the tapering 30a.

Moving progressively from the central area 30 to the opposite side end areas 31, the tapering 30a extends increasingly downwards until it joins to the tapering 31a. The latter extends increasingly towards the upper surface 20a moving progressively towards the side surfaces 20c of the element 20 made of friction-wearing material.

Figure 5:
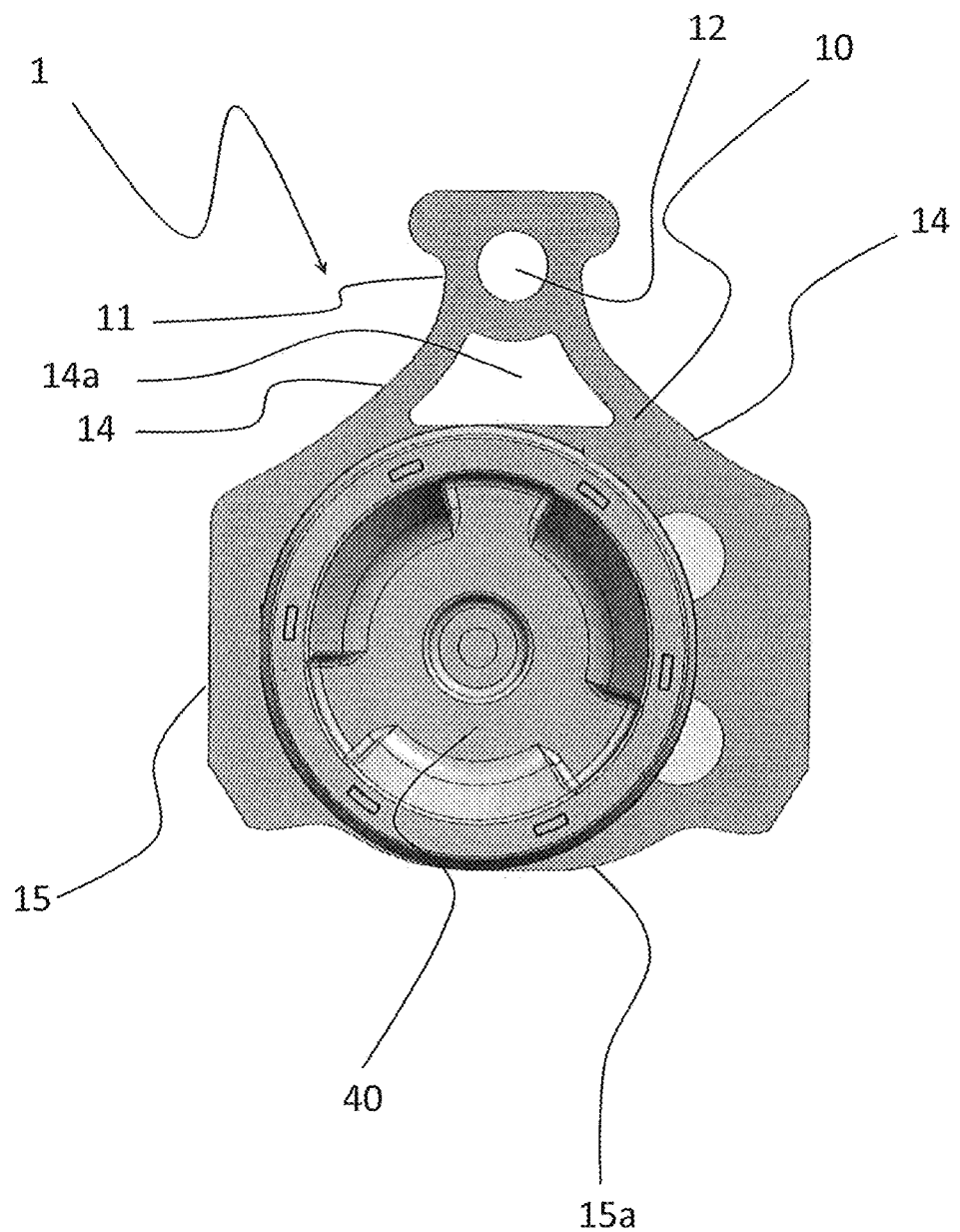
FIG. 5 is a schematic rear view of the pad of FIG. 1 and of a pneumatic piston associated therewith.

FIG. 5 shows a pneumatic piston 40 associated with the pad 1, in particular with the face of the portion 15 of the frame 10 opposite the one with which the element 20 made of friction-wearing material is associated. The pneumatic piston 40 belongs to a pneumatic circuit of a hydraulically-controlled disc brake 100.

A magnetic element (not visible) is arranged between the pneumatic piston 40 and the frame 10. Such a magnetic element is fixedly associated with the pneumatic piston 40 and coupled by magnetic attraction with the frame 10.

FIG. 9 shows an embodiment of a hydraulically-controlled disc brake 100 in accordance with what is described above. In such an embodiment, when the brake lever is actuated each pneumatic piston 40 pushes the respective pad 1 against the brake disc 60. When the brake lever is released, each pneumatic piston 40 goes back into its initial position and each pad 1 moves away from the brake disc 60 due to the magnetic attraction exerted by the magnetic element fixedly connected to the respective pneumatic piston 40.

FIG. 10 shows an alternative embodiment of a hydraulically-controlled disc brake 100 in accordance with what is described above. In such an embodiment, in place of the aforementioned magnetic element a spring 45 is used. The spring 45 is arranged between the two frames 10 of the pads 1 of the disc brake 100. When the brake lever is activated, each pneumatic piston 40 pushes the respective pad 1 against the brake disc 60, stressing the spring 45 by compression. When the brake lever is released, each pneumatic piston 40 goes back into its initial position and each pad 1 moves away from the brake disc 60 through the effect of the elastic thrust exerted by the spring 45.

The pad 1 described above can also be used in a manually-controlled disc brake.

Of course, those skilled in the art can make numerous modifications and changes to the present invention in order to satisfy specific and contingent requirements, all of which are in any case within the scope of protection defined by the following claims.

What is claimed is:

1. A pad for a bicycle disc brake, comprising a support frame and an element made of friction-wearing material associated with said support frame, wherein the element made of friction-wearing material has a rear surface connected to the support frame, an upper surface, a lower surface, two opposite side surfaces between the upper and lower surface, a front surface that is opposite to the rear surface and defines a wear surface of the element made of friction-wearing material, and a visual wearing indicator that defines in the element made of friction-wearing material a step interposed between the upper surface and one of the two opposite side surfaces, and that comprises an inclined surface connecting the upper surface to said one of the two opposite side surfaces.

2. The pad according to claim 1, wherein the step in the element made of friction-wearing material is defined at a corner in which said upper surface joins with said one of the two opposite side surfaces.

3. The pad according to claim 1, wherein the element made of friction-wearing material has a predetermined thickness and the visual wearing indicator defined in the element made of friction-wearing material has a second predetermined thickness that is less than said predetermined thickness of said element of friction-wearing material.

4. The pad according to claim 3, wherein said step is obtained by removal of material.

5. The pad according to claim 1, wherein the element made of friction-wearing material comprises a beveled lower portion.

6. The pad according to claim 5, wherein the element made of friction-wearing material comprises an upper surface, a lower surface and two opposite side surfaces, wherein said beveled lower portion extends along an entirety of said lower surface.

7. The pad according to claim 5, wherein said beveled lower portion comprises a central area having a first tapering and opposite side end areas each having a second tapering, wherein said second tapering extends towards said upper surface more than said first tapering.

8. The pad according to claim 7, wherein said second tapering is defined at a corner in which said lower surface joins with at least one of said side surfaces.

9. The pad according to claim 1, wherein the support frame comprises a fastening portion provided with a hole for the attachment of the pad to a caliper of the disc brake and a support portion for supporting the element made of friction-wearing material, wherein said fastening portion comprises a pair of arms that extend from said hole towards opposite side ends of the element made of friction-wearing material.

10. A bicycle disc brake, comprising a pair of pads according to claim 1.

11. The bicycle disc brake according to claim 10, wherein the support frame is made of a metallic material and wherein the bicycle disc brake comprises a pneumatic piston coupled with the support frame through at least one magnetic element fixedly associated with the pneumatic piston and arranged between the pneumatic piston and the support frame.

12. A pad for a bicycle disc brake, comprising a support frame and an element made of friction-wearing material associated with said support frame, wherein the element made of friction-wearing material has a visual wearing indicator in said friction-wearing material that is visible prior to any wearing of the friction-wearing material, wherein the element made of friction-wearing material has a predetermined thickness and a recess in said predetermined thickness that defines the visual wearing indicator;

wherein said recess comprises two substantially perpendicular surfaces, a first surface of said two surfaces defining, in said element made of friction-wearing material, an area of reduced thickness with respect to said predetermined thickness and a second surface of said two surfaces having a height equal to the difference between said predetermined thickness and said reduced thickness, wherein the visual wearing indicator is defined by said second surface, wherein the element made of friction-wearing material comprises an upper surface, a lower surface and two opposite side surfaces, wherein said second surface is an inclined surface that connects said upper surface and one of said side surfaces.

13. A bicycle disc brake pad comprising:

a support frame;

a friction-wearing element mounted on said support frame, the friction-wearing element has a front surface, an upper surface, a lower surface substantially perpendicular to the front surface, and two opposite side surfaces;

wherein said friction-wearing element has a visual wearing indicator defined by a step positioned in the front surface at a location where a first portion of said upper surface joins with one of said side surfaces; and wherein the front surface directly joins a second portion of said upper surface with the lower surface.

14. A bicycle disc brake pad, comprising:

a support frame;

a friction-wearing element mounted on said support frame and having a rear surface connected to the support frame, an upper surface, a lower surface, two opposite side surfaces, and a front surface opposite to the rear surface and continuous between the two opposite side surfaces and defining a wear surface;

a visual wearing indicator in the friction-wearing element;

the visual wearing indicator being a recess surface obtained in the front surface by partial removal of material, wherein said recess surface is an inclined surface that is interposed between the upper surface and one of the opposite side surfaces and that connects said upper surface and said one of the opposite side surfaces.

\* \* \* \* \*